(12) United States Patent
Saita

(10) Patent No.: US 6,667,656 B2
(45) Date of Patent: Dec. 23, 2003

(54) COLOR SEPARATING OPTICAL SYSTEM

(75) Inventor: Arihiro Saita, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/153,813

(22) Filed: May 24, 2002

(65) Prior Publication Data

US 2003/0007252 A1 Jan. 9, 2003

(30) Foreign Application Priority Data

Jun. 12, 2001 (JP) ........................ 2001-177611

(51) Int. Cl.⁷ .................. G02B 27/14; H04N 9/07; G03B 21/00
(52) U.S. Cl. ................. 329/634; 359/638; 348/338; 353/33
(58) Field of Search ................ 359/629, 634, 359/638, 831, 833; 348/336–339; 353/31, 33

(56) References Cited

U.S. PATENT DOCUMENTS 3,905,684 A * 9/1975 Cook et al. .................. 359/633
4,058,827 A * 11/1977 Ando et al. .................. 348/337
4,589,015 A * 5/1986 Nakata et al. ............... 348/259

FOREIGN PATENT DOCUMENTS

| JP | 03-209419 | 9/1991 |
| JP | 10-042101 | 2/1998 |
| JP | 11-038357 | 2/1999 |
| JP | 2000-098442 | 4/2000 |

* cited by examiner

*Primary Examiner*—Georgia Epps
*Assistant Examiner*—Hillary Choi
(74) *Attorney, Agent, or Firm*—Snider & Associates; Ronald R. Snider

(57) ABSTRACT

In a color separating optical system, a first filter adapted to eliminate from light emitted from a red light exit face a light component in a wavelength range longer than a longer-wavelength-side boundary wavelength of a red visible light wavelength region is disposed at a prism surface in an optical path for guiding red region light, whereas a second filter adapted to reflect a light component in a wavelength range longer than a reference wavelength which is longer than the longer-wavelength-side boundary wavelength by a predetermined wavelength but transmit therethrough a light component in a wavelength region shorter than the reference wavelength is placed at the red light exit face.

7 Claims, 4 Drawing Sheets

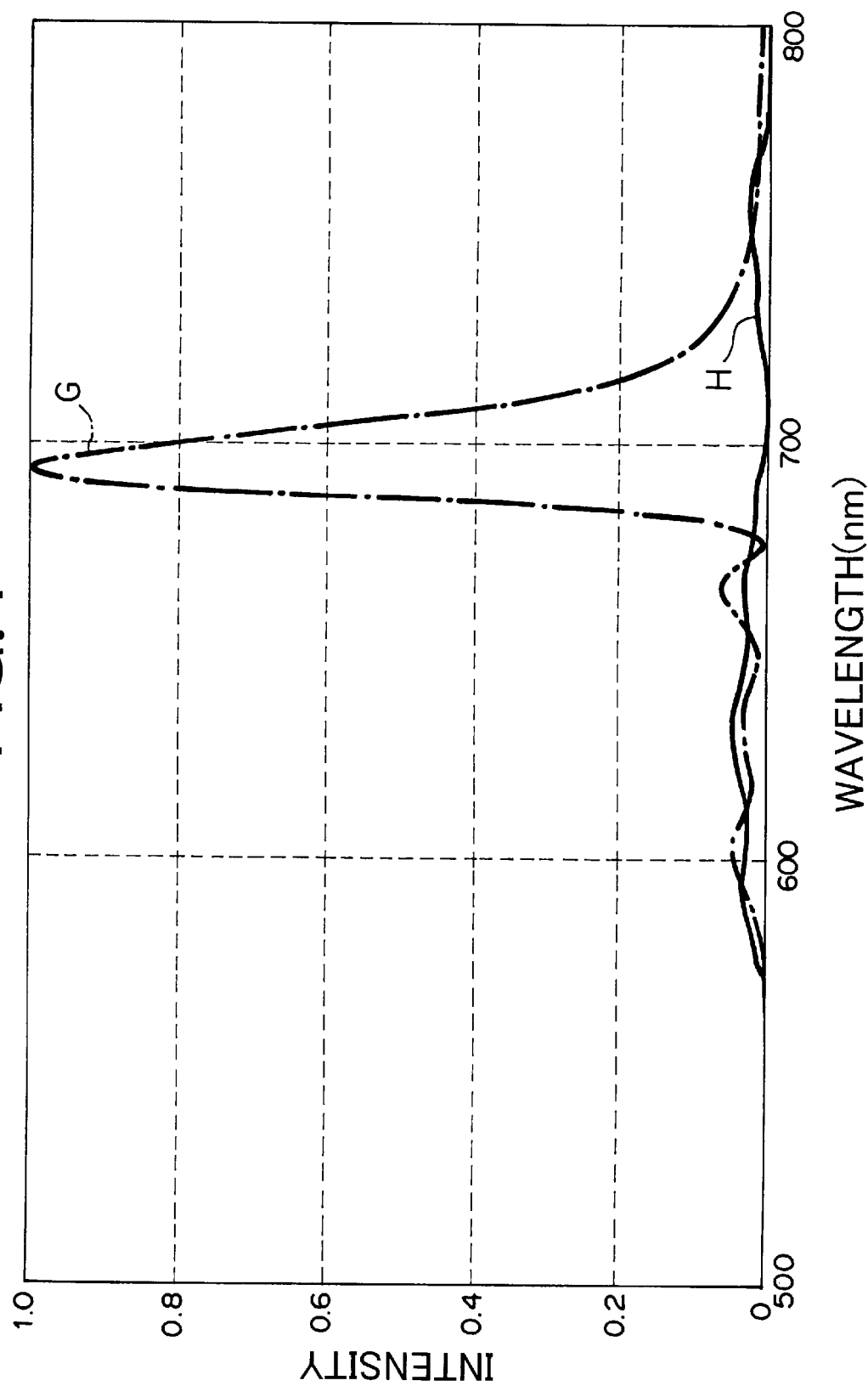

COLOR SEPARATING OPTICAL SYSTEM

RELATED APPLICATIONS

This application claims the priority of Japanese Patent Application No. 2001-177611 filed on Jun. 12, 2001, which is incorporated herein by reference.

BACKGROUND OF THE INVENTION

1. Field of the Invention

The present invention relates to a color separating optical system mainly used in imaging apparatus such as TV cameras and video cameras. More specifically, it relates to a color separating optical system, constituted by a combination of a plurality of prisms and wavelength-selective filters, for decomposing incident light into three light components, i.e., a light component (hereinafter referred to as "blue region light") in a short wavelength region including blue light, a light component (hereinafter referred to as "green region light") in an intermediate wavelength region including green light, and a light component (hereinafter referred to as "red region light") in a long wavelength region including red light, and emitting thus obtained individual light components toward solid-state imaging devices and the like.

2. Description of the Prior Art

As this kind of color separating optical systems, various optical systems have conventionally been known, such as those known as Philips type and cross dichroic type according to characteristic features in how a plurality of prisms and color-separating optical filters (hereinafter simply referred to as "filters") are combined.

In recent years, as imaging devices for converting captured optical images into electric signals in imaging apparatus such as TV cameras incorporating the above-mentioned kind of color separating optical systems, solid-state imaging devices such as CCD have recently come into use in place of image pickup tubes in general. Hence, it becomes easier to carry out a technique which has been difficult when using image pickup tubes which are likely to cause problems such as burn-in, i.e., a technique in which an object image having a high luminance is captured into a color separating optical system so as to be decomposed in terms of colors and then each color light component is emitted to the imaging surface of its corresponding solid-state imaging device while in a high luminance state.

However, the imaging surface of a solid-state imaging device has a high reflectivity in general since it is provided with a metal coating film and so forth. Therefore, light having a high luminance incident on the imaging surface may be reflected by the imaging surface, so as to return to the light exit face of the color separating optical system, and thus returned light is likely to be reflected by the light exit face and then enter the imaging surface of the solid-state imaging device again. Such a back-and-forth travel of light occurring between the light exit face of color separating optical system and the imaging surface of solid-state imaging device may generate ghost and flare, thereby adversely affecting images.

Recently, methods for suppressing such a back-and-forth travel of light in the green light region, in particular, have been proposed. For example, Japanese Unexamined Patent Publication No. 2000-98442 discloses a proposal for adjusting spectral characteristics of a trimming filter disposed at a green light exit face of a color separating optical system, so as to reduce the quantity of light reflected by the green light exit face, thereby restraining the back-and-forth travel of light from occurring between the green light exit face and the imaging surface of the solid-state imaging device.

In principle, such a back-and-forth travel of light is not limited to the green region light, but may occur in the red region light and blue region light as well. However, due to the sensitivity of solid-state imaging device and the like, it had hardly been regarded problematic except in the green region light. Nevertheless, technical improvements in solid-state imaging devices and the like have brought adverse affects caused by the above-mentioned back-and-forth travel of light into notice in the red region light as well, thereby enhancing a demand for suppressing this phenomenon.

Hence, a trimming filter may be disposed at the red light exit face of the color separating optical system, and spectral characteristics of the trimming filter may be adjusted so as to reduce the quantity of light reflected by the red light exit face, thereby suppressing the back-and-forth travel of red region light. However, this technique is hard to attain satisfactory results.

As a reason why the above-mentioned technique fails, it is presumed that, due to filters such as dichroic films disposed at prism surfaces in conventional color separating optical systems, the red region light is guided to the red light exit face while in a state where only the shorter wavelength side is cut, whereas the green region light is guided to the green light exit face while in a state where both shorter and longer wavelength sides are cut (see Japanese Unexamined Patent Publication No. HEI 11-38357 and the like). Namely, when suppressing the reflection at the red light exit face by cutting the longer wavelength side with a trimming filter disposed at the red light exit face, the amount of reflection at the red light exit face theoretically depends on the area of the overlapping part between the respective characteristic curves indicating transmission and reflection characteristics of the trimming filter because of the fact that the reflection characteristic of the trimming filter is the reverse of the transmission characteristic thereof. While the area of the above-mentioned overlapping part must be reduced in order to lower the amount of reflection at the red light exit face, spectral characteristics (transmission and reflection characteristics) of the trimming filter must be particularly excellent, i.e., substantially 100% at each wavelength, in order to attain sufficient results. Trimming filters having such excellent spectral characteristics are very hard to prepare, which makes it quite difficult to suppress the back-and-forth travel of light at the red light exit face.

SUMMARY OF THE INVENTION

In view of foregoing circumstances, it is an object of the present invention to provide a color separating optical system which can reduce the amount of reflection of return light from a solid-state imaging device at a red light exit face, thereby yielding favorable images free of ghost and flare.

For achieving the above-mentioned object, the present invention provides a color separating optical system comprising a plurality of prisms different from each other and a plurality of wavelength-selective filters having spectral characteristics different from each other for selectively transmitting or reflecting light in a predetermined wavelength range, the prisms and wavelength-selective filters separating light incident on an entrance face of the color separating optical system into a light component in a short wavelength region including blue light, a light component in an intermediate wavelength region including green light, and a light component in a long wavelength region including red light and emitting thus obtained individual light components from blue, green, and red light exit faces, respectively; the color separating optical system comprising a first filter, disposed at a prism surface other than the red light exit face in an optical path for guiding the light component in the long wavelength region including the red light, having a first wavelength characteristic adapted to eliminate from light emitted from the red light exit face a light component in a wavelength range longer than a predetermined longer-wavelength-side boundary wavelength of a red visible light wavelength region; and a second filter, disposed at the red light exit face, having a second wavelength characteristic adapted to reflect a light component in a wavelength range longer than a second boundary wavelength longer than the longer-wavelength-side boundary wavelength by a predetermined wavelength but transmit therethrough a light component in a wavelength region shorter than the second boundary wavelength.

Preferably, the first filter is a filter having a characteristic adapted to eliminate from the light emitted from the red light exit face a light component in a wavelength range shorter than a predetermined shorter-wavelength-side boundary wavelength of the red visible light wavelength region and the first characteristic.

Such a first filter may be constituted by a dichroic film having a spectral characteristic of reflecting a light component within a wavelength range from the shorter-wavelength-side boundary wavelength to the longer-wavelength-side boundary wavelength.

Preferably, the longer-wavelength-side boundary wavelength is set within a range from 680 nm to 730 nm, whereas the difference between the longer-wavelength-side boundary wavelength and the second boundary wavelength is set within a range from 15 nm to 70 nm.

The color separating optical system may comprise a color separating prism of Philips type or cross dichroic type.

BRIEF DESCRIPTION OF THE DRAWINGS

FIG. 4 is a chart comparing intensity distributions of re-reflected light at a red light exit face.

DESCRIPTION OF THE PREFERRED EMBODIMENTS

In the following, embodiments of the present invention will be explained with reference to the drawings.

Figure 1:
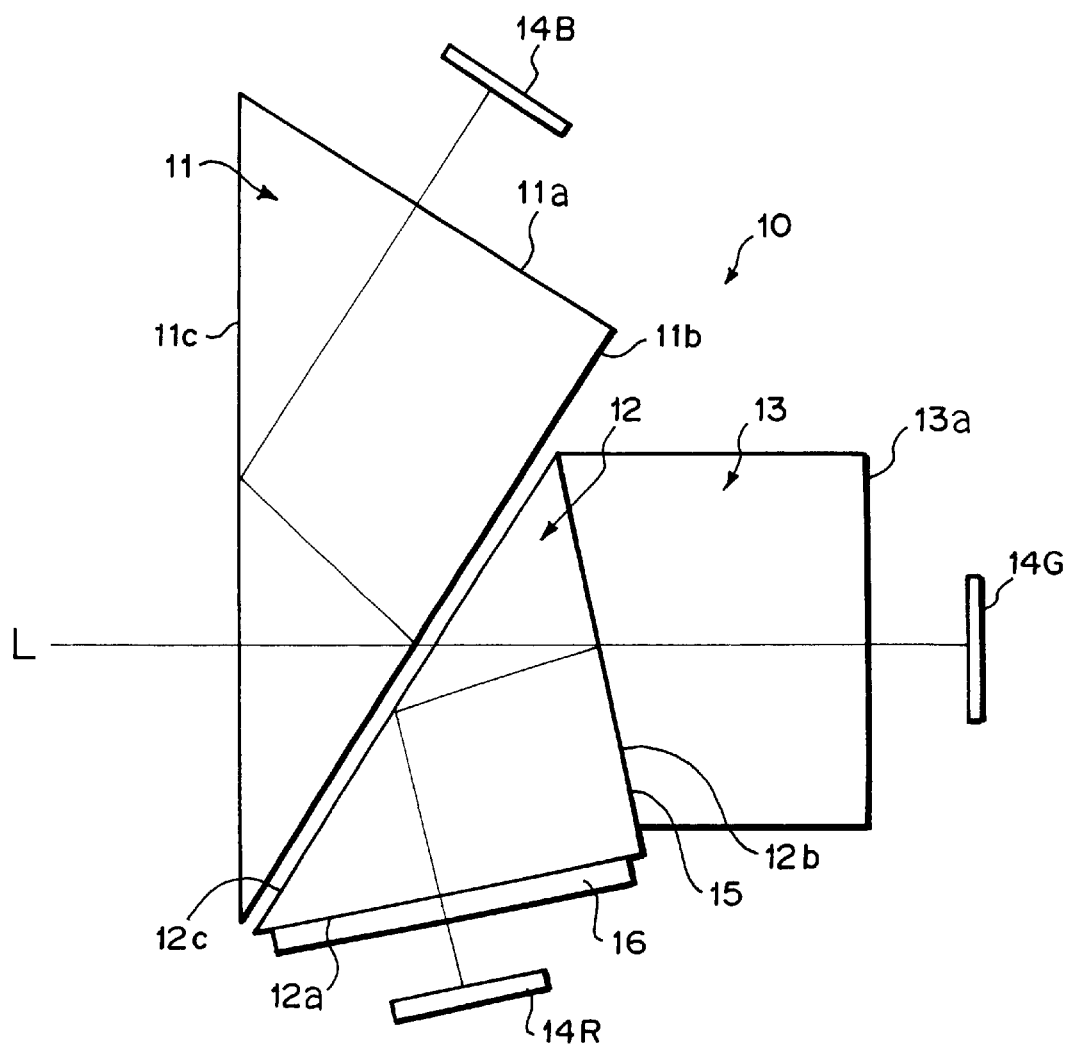
FIG. 1 is a view showing the configuration of the color separating optical system in accordance with an embodiment of the present invention.

FIG. 1 is a view showing the configuration of the color separating optical system in accordance with an embodiment of the present invention.

As shown in FIG. 1, the color separating optical system in accordance with this embodiment comprises a color separating prism 10 of Philips type disposed on an optical path L of white light emitted from a light source which is not depicted. The color separating prism 10 is constituted by a blue color separating prism 11, a red color separating prism 12, and a green color separating prism 13. A solid-state imaging device 14B for blue is disposed so as to face a blue light exit face 11a of the blue color separating prism 11. A solid-state imaging device 14R for red is disposed so as to face a red light exit face 12a of the red color separating prism 12. A solid-state imaging device 14G for green is disposed so as to face a green light exit face 13a of the green separating prism 13.

A reflection prism surface 11b of the blue color separating prism 11 is provided with a blue reflecting dichroic film adapted to reflect only a light component (blue region light) in a short wavelength region including blue light but transmit therethrough a light component (green region light) in an intermediate wavelength region including green light and a light component (red region light) in a long wavelength region including red light. A reflection prism surface 12b located at the boundary of the red color separating prism 12 with respect to the green color separating prism 13 is provided with a first filter 15 made of a red-reflecting dichroic film having a spectral characteristic adapted to reflect a light component within a red visible light wavelength region in the light incident on the red color separating prism 12 but transmit therethrough a light component other than this wavelength region. On the other hand, the red light exit face 12a of the red color separating prism 12 is provided with a second filter 16 made of a trimming filter having a spectral characteristic adapted to reflect a light component in a wavelength range longer than a second boundary wavelength longer than the longer-wavelength-side boundary wavelength of first filter 15 by a predetermined wavelength (ranging from 15 nm to 70 nm) and transmit therethrough a light component in a wavelength range shorter than the second boundary wavelength.

The light emitted from the unshown light source is incident on an entrance prism face 11c of the blue color separating prism 11 along the optical path L and reaches the reflection prism surface 11b. Only the blue region light is reflected by the reflection prism surface 11b, whereas the green region light and red region light are transmitted therethrough. The blue region light reflected by the reflection prism surface 11b is totally reflected by the entrance prism face 11c and then is emitted from the blue light exit face 11a, so as to be captured by the color solid-state imaging device 14B for blue.

In the green region light and red region light transmitted through the reflection prism surface 11b of the blue color separating prism 11, on the other hand, the red region light is reflected by the reflection prism surface 12b provided with the first filter 15, whereas the green region light is transmitted therethrough. Thus transmitted green region light is transmitted through the green separating prism 13 and emitted from the green light exit face 13a, so as to be captured by the solid-state imaging device 14G for green.

The red region light reflected by the reflection prism surface 12b of the red color separating prism 12 is totally reflected by a total reflection surface 12c of the red color separating prism 12, so as to reach the red light exit face 12a. After the light component in the long wavelength region not totally eliminated by the first filter is eliminated therefrom by the second filter, the remaining red region light is emitted from the red light exit face 12a, so as to be captured by the solid-state imaging device 14R for red.

Figure 2:
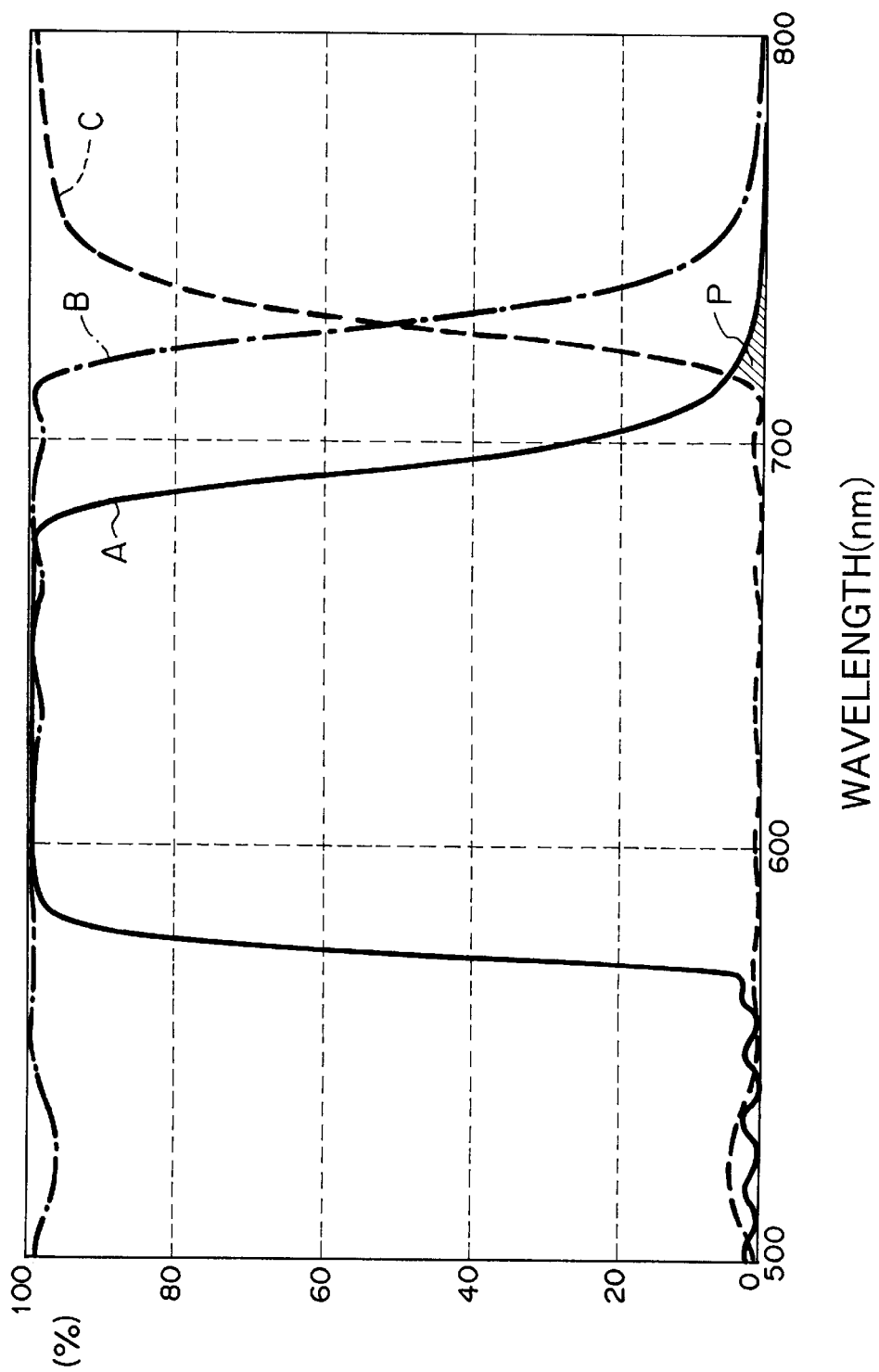
FIG. 2 is a chart showing spectral characteristics of first and second filters.

FIG. 2 shows an example of spectral characteristics of the first filter 15 and second filter 16. In this embodiment, the first filter 15 is configured such that, as indicated by its reflection characteristic curve A, shorter- and longer-wavelength-side boundary wavelengths of the red visible light wavelength region are set to mesial points of 573 nm and 688 nm, respectively, so as to reflect red visible light within this wavelength range but transmit therethrough light outside the wavelength range. This spectral characteristic of the first filter can be obtained when the dichroic film is formed by the film configuration shown in Table 1 (follows).

On the other hand, the second filter 16 is configured such that, as indicated by its transmission characteristic curve B, the second boundary wavelength is set, for example, to 728 nm longer than the longer-wavelength-side boundary wavelength of the first filter 15 by 40 nm in terms of the mesial point, whereby a light component in a wavelength range longer than the second boundary wavelength is reflected, whereas a light component in a wavelength range shorter than the second boundary wavelength is transmitted therethrough.

The second filter 16 reflects and eliminates the light in the long wavelength region not completely eliminated by the first filter 15, and transmits therethrough a part of return light reflected by the imaging surface of the solid-state imaging device 14R for red after being emitted from the red light exit face 12a but reflects the remaining part thereof. The quantity of light reflected by the second filter is one obtained when the reflectance of reflection characteristic curve A of the first filter and the reflectance of reflection characteristic curve C (the reverse of transmission characteristic curve B) of the second filter are multiplied by each other in the overlapping part P between these characteristic curves A and C.

Figure 3:
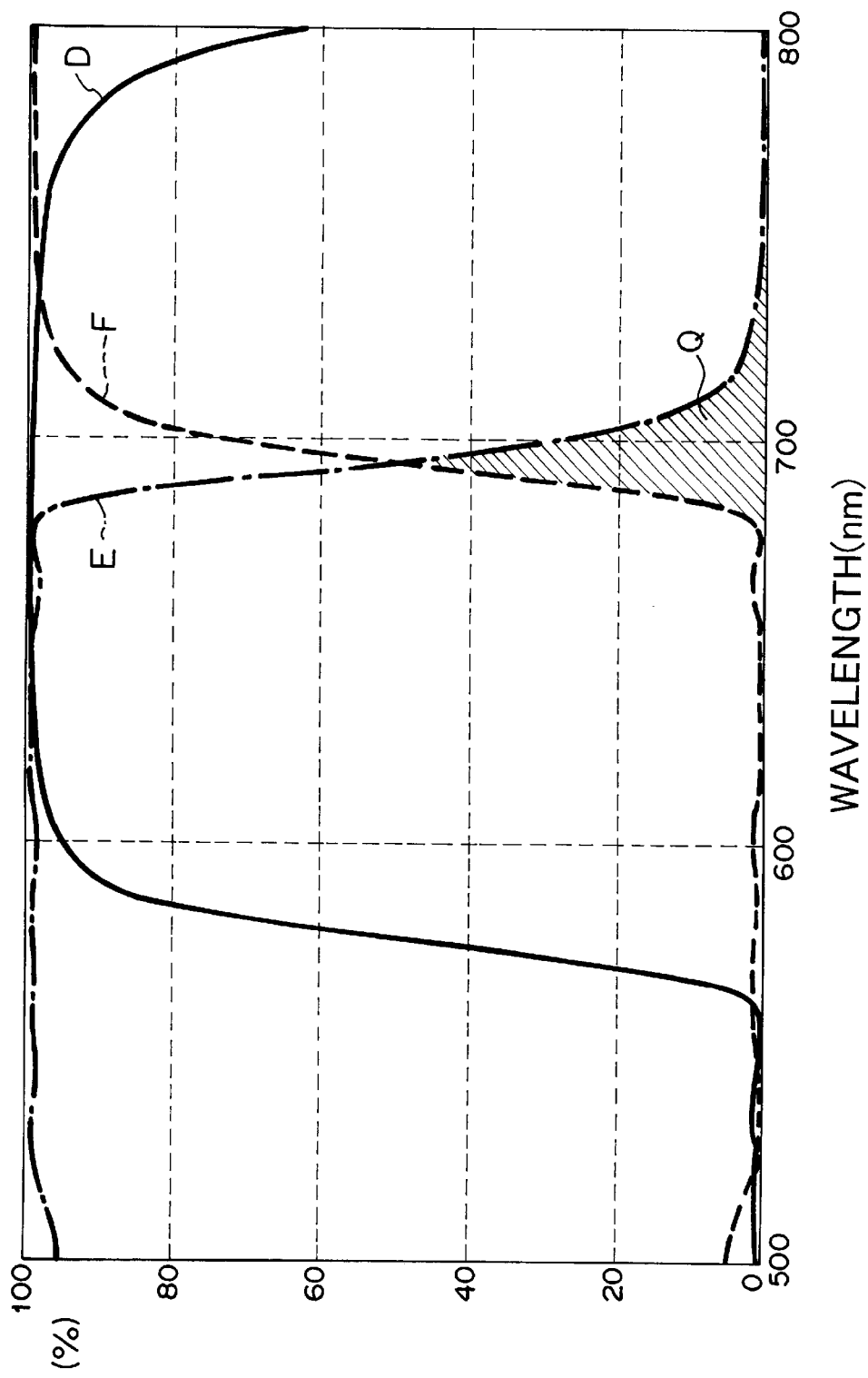
FIG. 3 is a chart showing spectral characteristics of a comparative example.

FIG. 3 shows a comparative example. In this comparative example, a red-reflecting dichroic film having a spectral characteristic different from that mentioned above is placed at the reflection prism surface 12b of the red color separating prism 12, whereas a trimming filter having a spectral characteristic different from that mentioned above is placed at the red light exit face 12a. The spectral characteristic of the dichroic film is a general one in which, as indicated by reflection characteristic curve D in FIG. 3, the shorter-wavelength-side boundary wavelength is set near the mesial point of 570 nm whereas its longer-wavelength-side boundary wavelength is not set in particular. Namely, this dichroic film reflects a light component in a wavelength range longer than 570 nm. On the other hand, the spectral characteristic of the trimming filter is set such that, as indicated by reflection characteristic curve E in FIG. 3, the longer-wavelength-side boundary wavelength of the red visible light wavelength region is set near the mesial point of 690 nm, whereby a light component in a wavelength range longer than 690 nm is reflected whereas a light component in a wavelength range shorter than 690 nm is transmitted therethrough.

In such a comparative example, the quantity of light re-reflected by the red light exit face 12a in the return light reflected by the imaging surface of the solid-state imaging device 14R for red after being emitted from the red color exit face 12a is one obtained when the transmittance of transmission characteristic curve E of the trimming filter and the reflectance of reflection characteristic curve F (the reverse of transmission characteristic curve E) of the trimming filter are multiplied by each other in the overlapping part Q between these characteristic curves E and F.

FIG. 4 shows the intensity of re-reflected light at the red light exit face 12a. FIG. 4 is a chart showing intensity distributions of re-reflected light for each wavelength, standardized with the highest intensity value in the comparative example taken as 1. It can be seen that intensity distribution curve H exhibits a value much lower than that of intensity distribution curve G of the comparative example.

From the result shown in FIG. 4 and the result that the overlapping part P in FIG. 2 has an area much smaller than that of the overlapping area Q in FIG. 3, it is seen that the example can suppress the quantity of re-reflected light at the red light exit face 12a to a very low level, thereby making it possible to restrain ghost and flare from occurring in the solid-state imaging device 14R for red.

Here, the imaging devices 14R for red used in the above-mentioned example and comparative example have substantially the same reflectance, whereby this reflectance is omitted from the characteristics curves of FIGS. 2 and 3.

Though the first filter in the foregoing embodiment has such a spectral characteristic that a light component within the red visible light wavelength region is reflected whereas a light component outside the region is transmitted therethrough, it may have such a spectral characteristic that a light component within the red visible light wavelength region is transmitted therethrough whereas a light component outside the region is reflected, so as to guide the red light component to the red light exit face. When this configuration is applied to the same color separating prism of Philips type as that of the above-mentioned embodiment, the red light exit face and green light exit face replace their positions with each other.

It will be sufficient for the first filter to be placed in an optical path for guiding the red light component. For example, if the reflection prism surface 12c of the red color separating prism 12 is not a total reflection surface in the above-mentioned embodiment, the first filter can be placed at this position. In this case, the first filter may have a characteristic of transmitting a light component in a wavelength range longer than the longer-wavelength-side boundary wavelength of the red visible light wavelength region alone, whereas another filter placed at the reflection prism surface 12b of the red color separating prism 12, for example, may have a characteristic of eliminating a light component in a wavelength range shorter than the shorter-wavelength-side boundary wavelength of the red visible light wavelength region.

Though the color separating prism of Philips type is used in the above-mentioned embodiment, the present invention is also applicable to other color separating prisms such as those of cross dichroic type in which the first and second filters in the present invention can be used in combination.

The idea of the present invention can also be employed on the shorter wavelength side of blue region light.

In the color separating optical system in accordance with the present invention, as explained in detail in the foregoing, a first filter adapted to eliminate from light emitted from a red light exit face a light component in a wavelength range longer than a longer-wavelength-side boundary wavelength of a red visible light wavelength region is disposed at a prism surface in an optical path for guiding red region light, whereas a second filter adapted to reflect a light component in a wavelength range longer than a reference wavelength which is longer than the longer-wavelength-side boundary wavelength by a predetermined wavelength but transmit therethrough a light component in a wavelength region shorter than the reference wavelength is placed at the red light exit face, so that the amount of reflection of return light from a solid-state imaging device for red can be reduced at the red light exit face, whereby favorable images free of ghost and flare can be obtained.

TABLE 1

| | Film thickness (nm) | Material | | Film thickness (nm) | Material |
|---|---|---|---|---|---|
| 1st layer | 214.28 | TiO$_2$ | 2nd layer | 44.33 | SiO$_2$ |
| 3rd layer | 118.02 | TiO$_2$ | 4th layer | 32.22 | SiO$_2$ |
| 5th layer | 104.98 | TiO$_2$ | 6th layer | 32.39 | SiO$_2$ |
| 7th layer | 106.31 | TiO$_2$ | 8th layer | 57.28 | SiO$_2$ |
| 9th layer | 106.21 | TiO$_2$ | 10th layer | 47.27 | SiO$_2$ |
| 11th layer | 100.66 | TiO$_2$ | 12th layer | 48.67 | SiO$_2$ |
| 13th layer | 105.86 | TiO$_2$ | 14th layer | 43.17 | SiO$_2$ |
| 15th layer | 102.73 | TiO$_2$ | 16th layer | 46.04 | SiO$_2$ |
| 17th layer | 101.85 | TiO$_2$ | 18th layer | 56.95 | SiO$_2$ |
| 19th layer | 106.49 | TiO$_2$ | 20th layer | 46.35 | SiO$_2$ |
| 21st layer | 101.02 | TiO$_2$ | 22nd layer | 40.45 | SiO$_2$ |
| 23rd layer | 112.56 | TiO$_2$ | 24th layer | 50.47 | SiO$_2$ |
| 25th layer | 113.32 | TiO$_2$ | 26th layer | 11.67 | SiO$_2$ |
| 27th layer | 104.75 | TiO$_2$ | 28th layer | 32.71 | SiO$_2$ |
| 29th layer | 111.59 | TiO$_2$ | 30th layer | 115.33 | SiO$_2$ |

What is claimed is:

1. A color separating optical system comprising a plurality of prisms different from each other and a plurality of wavelength-selective filters having spectral characteristics different from each other for selectively transmitting or reflecting light in a predetermined wavelength range, said prisms and wavelength-selective filters separating light incident on an entrance face of said color separating optical system into a light component in a short wavelength region including blue light, a light component in an intermediate wavelength region including green light, and a light component in a long wavelength region including red light and emitting thus obtained individual light components from blue, green, and red light exit faces, respectively; said color separating optical system comprising:

a first filter, disposed at a prism surface other than said red light exit face in an optical path for guiding said light component in said long wavelength region including said red light, having a first wavelength characteristic adapted to eliminate from light emitted from said red light exit face a light component in a wavelength range longer than a predetermined longer-wavelength-side boundary wavelength of a red visible light wavelength region; and a second filter, disposed at said red light exit face, having a second wavelength characteristic adapted to reflect a light component in a wavelength range longer than a second boundary wavelength which is longer than said longer-wave length-side boundary wavelength by a predetermined wavelength but which transmits therethrough a light component in a wavelength region shorter than said second boundary wavelength.

2. A color separating optical system according to claim 1, wherein said first filter is a filter having a characteristic adapted to eliminate from said light emitted from said red light exit face a light component in a wavelength range shorter than a predetermined shorter-wavelength-side boundary wavelength of said red visible light wavelength region and said first characteristic.

3. A color separating optical system according to claim 2, wherein said first filter is constituted by a dichroic film having a spectral characteristic of reflecting a light component within a wavelength range from said shorter-wavelength-side boundary wavelength to said longer-wavelength-side boundary wavelength.

4. A color separating optical system according to claim 1, wherein said longer-wavelength-side boundary wavelength is set within a range from 680 nm to 730 nm, whereas the difference between said longer-wavelength-side boundary wavelength and said second boundary wavelength is set within a range from 15 nm to 70 nm.

5. A color separating optical system according to claim 1, wherein said color separating optical system comprises a color separating prism of Philips type.

6. A color separating optical system according to claim 1, wherein said color separating optical system comprises a color separating prism of cross dichroic type.

7. A color separating optical system according to claim 1, wherein said second filter is a trimming filter having a spectral characteristic of reflecting a light component in a wavelength range longer than said second boundary wavelength but which transmits therethrough a light component in a wavelength region shorter than said second boundary wavelength.

* * * * *

UNITED STATES PATENT AND TRADEMARK OFFICE
CERTIFICATE OF CORRECTION

PATENT NO. : 6,667,656 B2
DATED : December 23, 2003
INVENTOR(S) : Arihiro Saita

It is certified that error appears in the above-identified patent and that said Letters Patent is hereby corrected as shown below:

<u>Column 8,</u>
Line 5, delete "longer-wave length-side" and substitute therefore -- longer-wavelength-side --

Signed and Sealed this

Twentieth Day of April, 2004

JON W. DUDAS
*Acting Director of the United States Patent and Trademark Office*